P. Longwell,
Saw.
No. 105,704. Patented July 26, 1870.
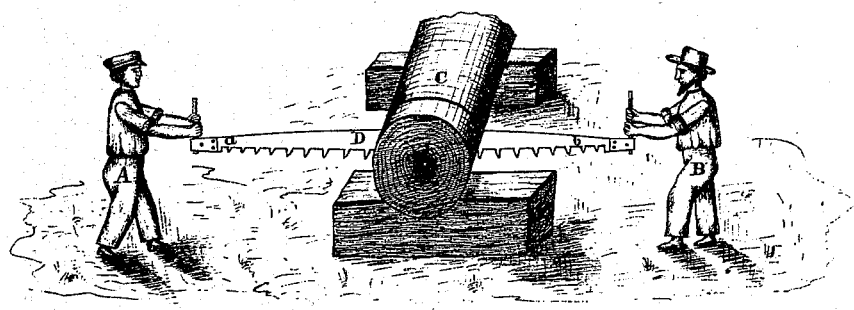
Fig. 1.
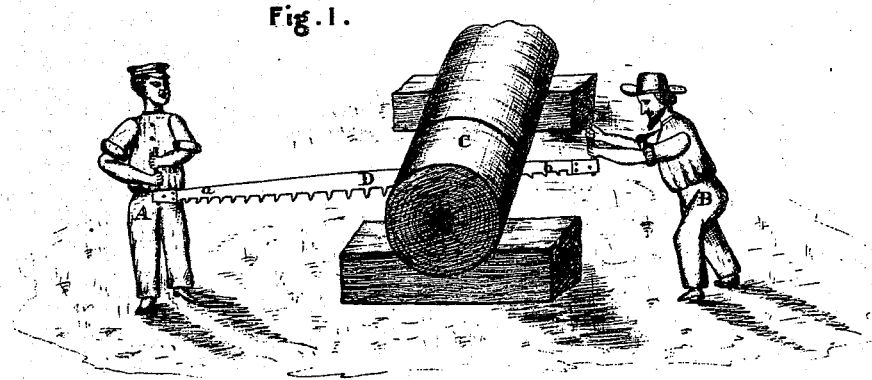
Fig. 2.
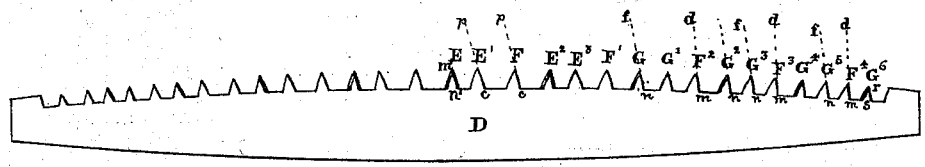
Fig. 3.
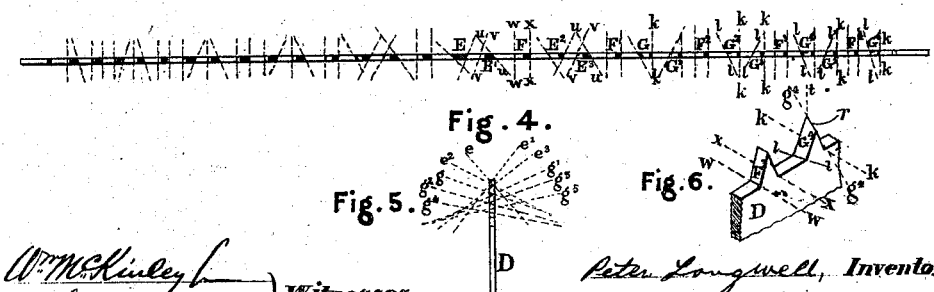
Fig. 4.
Fig. 5.   Fig. 6.
Witnesses:   Peter Longwell, Inventor.
             by J. L. Abbott, Attorney.

United States Patent Office.

PETER LONGWELL, OF POPLAR, OHIO.

Letters Patent No. 105,704, dated July 26, 1870.

---

IMPROVEMENT IN CROSS-CUT SAWS.

---

The Schedule referred to in these Letters Patent and making part of the same

---

*To all whom it may concern:*

Be it known that I, PETER LONGWELL, of Poplar, Crawford county, Ohio, have invented certain new and useful Improvements in Cross-cut Saws, and that the following is a full, clear, and exact specification thereof.

Nature and Objects of my Invention.

My invention consists in dressing the teeth in such a manner as to gradually increase the angle between the face of the teeth and the bevel edge of the teeth of a cross-cut saw from the center to the ends of the saw, so as to give a thinner and sharper cutting-edge to the center teeth, and thus cause the center of the saw to cut faster than the ends, whereby the work performed by the saw is better adjusted to the varying effective force of the labor expended in propelling the saw, and the fatigue experienced in sawing any given cross-section is materially diminished.

My invention, also, relates to the construction of a cross-cut saw with the teeth in the center third of the saw length dressed to an acute angle with the face of the plate on both sides, so as to form a double-edged point, and with the teeth in the end thirds of the saw length dressed to an acute angle with the face of the plate on the sides next the center of the saw, and to a face at right angles with the plate on the sides toward the ends of the saw.

By this construction the center teeth are made to perform most of the cutting at the sides of the kerf, the end teeth simply aiding in this cutting at the ends of the stroke where the operator is applying his power at the least advantage; thus, adapting the cutting resistance to the effective amount of labor at any point in a very perfect manner, while, on the back stroke of the saw, the end teeth act to remove the center of the kerf which was cut down by the thinner edges of the front teeth during the center of the previous stroke, thus effecting the tearing out of the center of the kerf at the commencement of the stroke, when the operator who applies the power at the commencement of the stroke is acting at the best advantage.

Description of Accompanying Drawing.

Figures 1 and 2 are views showing the practical working of my saw.

Figures 3 and 4 are side view and plan of saw embodying my invention.

Figure 5 is an end view of the same.

Figure 6 is a perspective view, showing the form of the teeth.

General Description.

D is the body of the saw-plate, which is made of steel in an ordinary form, and on the edge of which is formed the teeth E F G.

In order to lay out these teeth on my improved plan, I first determine on the length to be given to the center teeth, as well as on the length of the spaces to be left between them, both of which lengths will vary with the kind of lumber for which the saw is designed, and the character of laborers using it, and are matters to be governed by the experience and judgment of the designer.

Having determined the height $m'$ $n'$ of the center teeth E E', as well as the space between them, measuring from point to point, I lay off the end tooth $G^6$, of a height, $r$ $s$, about two-thirds as great as the height $m'$ $n'$ of the center teeth E, and then draw a line from $n'$ to $s$, corresponding in form to the edge of the plate D, thus obtaining a guide line by which the height of the teeth may be gradually and regularly diminished from the center to the end of the saw.

Then, commencing with the center teeth E', I space off the teeth F $E^2$ $E^3$ $F^1$ G $G^1$ $F^2$, and so on, making each space slightly less than the preceding one; the amount of decrement being such as to make the end space $F^4$ $G^6$ about two-thirds as long as the space E $E^1$.

The teeth having been spaced out in the manner described, the portion of the plate between the teeth is cut away, and the teeth are then filed up in the following manner:

Commencing with the center cutting-teeth E $E^1$, I file both sides of said teeth to an angle with the face of the plate D; the planes of said sides intersecting the plate D on the lines $u$ $u$ and $v$ $v$, as shown in fig. 4, and the planes of said sides intersecting each other on the lines $e$ and $e^1$, as shown in end view in fig. 5.

The next tooth F is called a "clearing-tooth," and is filed with both sides at right angles to the plate D, as shown by lines $w$ $w$ and $x$ $x$ in fig 4.

Then the two cutting-teeth $E^2$ $E^3$ are filed with both sides on an angle with the face of the plate D, as shown by lines $u$ $u$ and $v$ $v$, but this angle is slightly increased in each tooth, so that the bevel edge formed by the intersection of these sides makes a larger angle with the face of the plate D on the tooth $E^2$ than on the tooth $E^1$, or on the tooth $E^3$ than on the tooth $E^2$, and so on, as shown by the lines $e^2$ and $e^3$, drawn on said bevel edges in fig. 5; or, in other words, the tooth $E^1$ has a more acute cutting-point or cutting-edge than the tooth $E^2$, and the tooth $E^2$ is more acute transversely than the tooth $E^3$, and so on.

The next tooth $F^1$ is filed with square faces as a clearing-tooth, in the same manner as the tooth F, and is supposed to be located at the end of the center third of the length of the saw-blade.

The next tooth G, and each of the succeeding teeth $G^1$ $G^2$ $G^3$, and so on, are filed with the sides toward center of the saw at an acute angle with the face of the plate D, as shown in figs. 4 and 6, by the lines $l$ $l$, but the opposite sides of these teeth are filed at right angles to the face of the plate D, as shown by the lines k k.

The angular positions l l of the sides of these teeth toward the center of the saw are so adjusted as to give the gradual increase of angle between the bevel edges of said teeth and the face of the plate toward the ends of the saw, as shown by the lines $g\ g^1\ g^2\ g^3$, and so on, in figs. 5 and 6.

The clearing-teeth $F^2\ F^3$, and so on, are introduced between each pair of teeth $G\ G^1$, $G^2\ G^3$, $G^4\ G^5$, so that every third tooth in the saw is a clearing-tooth, as will be readily seen.

These clearing-teeth F should be filed a little shorter than the other teeth E G, and, in the drawing, the spaces at the sides of these teeth are represented as being somewhat larger in proportion than the other spaces, in order to give more room for the sawdust which is drawn out by these clearing-teeth, but this enlarged space will usually be found to be unnecessary, owing to the action of each of the teeth G as clearing-teeth.

The cutting-teeth $G\ G^1\ G^2$, and so on, in the end thirds of the saw, are dressed with a little greater pitch than the center teeth E F, (which are all made with the same pitch) and the clearing-teeth $F^2\ F^3$, and so on, in the end thirds are dressed with a little greater pitch than the cutting-teeth $G\ G^1$; the clearing-teeth $F^2\ F^3$ having their outer edges m d dressed nearly at right angles with the edge of the saw, and the cutting-teeth $G\ G^1$ having their outer edges n f dressed to an angle f n s, about half-way between the angle d m s and the angle p c s, made by the edge p c of the center teeth E with the edge of the saw; the object being to make the end teeth take a square hold on the kerf at the commencement of the stroke, so as to prevent the danger of their sliding over the kerf without tearing it up and drawing it out.

The advantages resulting from the peculiar dress of the saw-teeth, herein described, will be seen by examining the operation of sawing a log, C, by the two operators A and B, working with my improved saw D.

If we suppose the saw to be moving toward the operator A, in fig. 1, and consider that in hand cross-cut sawing, the motive power is applied in each stroke by the operator toward whom the saw is moving, it is evident that at the center of the stroke, as there represented, the saw D has about its maximum moving moment, and that A's arms are in a position to enable him to exert his muscular power to a good advantage, so that at this point the saw should be cutting with a maximum rapidity.

This is just what will take place at that point of the stroke, for there the large thin cutting-teeth $E\ E^1\ E^2\ E^3$ are in operation, and, owing to their thin knife-like points, they cut down rapidly at the sides of the kerf, as is readily seen.

But, as the saw end a approaches the operator A, his arms are gradually drawn up into the position shown in fig. 2, and it is evident that the nearer they come to this position, the less effective will be his power to move the saw; consequently, the end b, which is then in the log C, should move more easily through the log, to conform to this disadvantageous position of the operator A.

This is just the case with my improved dress, for, at this point, the fine teeth $G\ G^1\ G^2\ G^3$ are in operation, and are moving with their sharp edges forward, and, as each tooth is finer and has a more blunt cutting-point than the preceding one, it is evident that the saw will move more and more easily as it approaches the end of its stroke.

At the commencement of the return-stroke it is seen that the operator B, who furnishes power for the stroke, has his arms extended, as shown in fig. 2, so that he is in shape to apply his full power to the saw with the best advantage, and, as we have at this point a full muscular power with no moving moment of the saw, it will be of advantage to apply it to the removal of the kerf, which was cut down at the side by the forward stroke of the saw.

This is just the result produced by this improved dress, for, at this point, the square sides of the teeth $G^6\ G^5\ G^4\ G^3$, and so on, meet the center of the kerf, and loosen it up and drag it out, its removal being facilitated by the clearing-teeth $F^4\ F^3\ F^2$, and so on, as is readily seen.

It is evident that either one of the distinctive features of my saw dress, as set forth in my statement of the nature of my invention, could be applied separately to the construction of cross-cut saws, and would tend toward the required result, but all of these features should be combined to produce the best results.

*Claims.*

What I claim as new and of my invention, and desire to secure by Letters Patent, is—

1. A hand cross-cut saw, having the teeth thereon dressed in such a manner that the angle between the face of the saw-plate and the bevel edge of the teeth is gradually increased in size from the center to the ends of the saw, so as to obtain a thinner cutting-point on the center teeth than on the end teeth, substantially as is herein specified.

2. A hand cross-cut saw, having the teeth on the end thirds of the saw dressed to an acute angle with the face of the plate on the sides toward the center of the saw, and to faces at right angles to the plate on the opposite sides; the teeth on the center third of the plate being dressed on both sides to an acute angle with the face of the plate, substantially as and for the purpose specified.

As evidence of the foregoing, witness my hand this 19th day of May, A. D. 1870.

PETER LONGWELL.

Witnesses:
JOB ABBOTT,
ANDREW CHOFFIN.